United States Patent
Amulu

(10) Patent No.: US 9,665,351 B2
(45) Date of Patent: May 30, 2017

(54) GENERATING IN-MEMORY DATABASE APPLICATION

(71) Applicant: James Michael Amulu, Bangalore (IN)

(72) Inventor: James Michael Amulu, Bangalore (IN)

(73) Assignee: SAP SE, Walldorf (DE)

( * ) Notice: Subject to any disclaimer, the term of this patent is extended or adjusted under 35 U.S.C. 154(b) by 270 days.

(21) Appl. No.: 13/665,983

(22) Filed: Nov. 1, 2012

(65) Prior Publication Data
US 2014/0123099 A1 May 1, 2014

(51) Int. Cl.
*G06F 9/44* (2006.01)

(52) U.S. Cl.
CPC .................... *G06F 8/34* (2013.01)

(58) Field of Classification Search
CPC ............... G06F 8/60; G06F 8/34; G06F 8/30
USPC ....................................................... 717/100
See application file for complete search history.

(56) References Cited

U.S. PATENT DOCUMENTS

| | | | | |
|---|---|---|---|---|
| 7,596,620 | B1* | 9/2009 | Colton et al. | 709/226 |
| 8,584,019 | B1* | 11/2013 | Gala | 715/738 |
| 2002/0143468 | A1* | 10/2002 | Cheng et al. | 702/1 |
| 2005/0160104 | A1* | 7/2005 | Meera et al. | 707/100 |
| 2013/0097136 | A1* | 4/2013 | Goldberg | 707/704 |

* cited by examiner

*Primary Examiner* — Li B Zhen
*Assistant Examiner* — Hui-Wen Lin

(57) ABSTRACT

Various embodiments of systems and methods for generating a light weight in-memory database application are described herein. Application modules included in an application modules repository may be displayed on a user interface of the IDE tool. The application modules includes an in-memory database specific application module operable to communicate with the in-memory database and operation specific application modules operable to execute operations related to the in-memory database. A user may select application modules from the displayed application modules. A build operation may be executed on the selected application modules to generate the light weight in-memory database application. The in-memory database application may include the in-memory database specific application module and at least one of the operation specific application modules.

19 Claims, 9 Drawing Sheets

GENERATING IN-MEMORY DATABASE APPLICATION

FIELD

Embodiments generally relate to computer systems, and more particularly to methods and systems for generating an in-memory database application.

BACKGROUND

In-memory databases, such as SAP® HANA™ database, are increasingly becoming popular due to faster data processing and data retrieval compared to disk-based databases. To utilize the in-memory database, a user needs to perform different database related operations, such as database management, lifecycle management, security management, etc.

At present a single software application is provided to a user for performing the different database related operations mentioned above. However, this application can be "heavyweight", due to a single application having to support the different operations. This "heavyweight" application cannot be supported by a mobile device or hosted on a cloud, which is undesirable.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for generating an in-memory database application are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
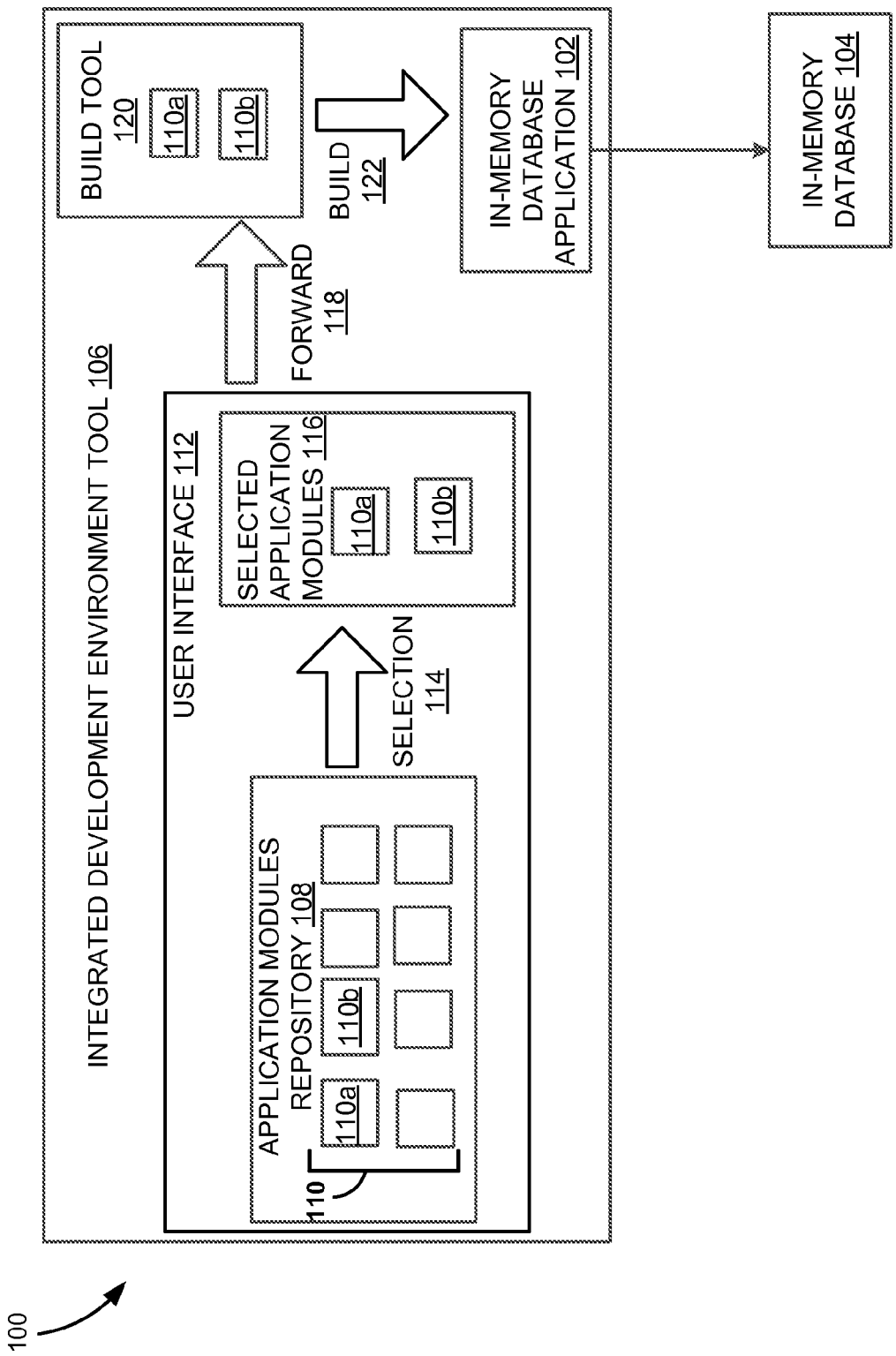
FIG. 1 is a block diagram illustrating a method for generating an in-memory database application, according to an embodiment.

FIG. 1 is a block diagram illustrating a method 100 for generating an in-memory database application 102, according to an embodiment. An in-memory database 104 is a database management system that relies on main memory for computer data storage. In-memory database 104 may be faster than disk-optimized database since the internal optimization algorithms are simpler and execute fewer CPU instructions. An in-memory database application 102 is a software application designed to help a user perform an in-memory database 104 related operation. An application, or a software application, is computer software designed to help a user perform specific tasks. For example, an in-memory database application may be designed to help a user perform a database administration operation related to the in-memory database, or to perform a lifecycle management operation related to the in-memory database, etc.

In one embodiment, an integrated development environment (IDE) tool 106 may be used by a user for generating the in-memory database application 102. An IDE tool 106 is a software application that provides facilities to computer programmers for software development. An application modules repository 108, installed on the IDE tool 106, may include application modules 110 that allow the user to generate the in-memory database application 102. An application module is a software component operable to execute an operation related to the in-memory database 102. In one embodiment, each of the application modules 110, in the application modules repository 108, may be operable to execute a particular operation related to the in-memory database 102. For example, the application module 110a may be operable to execute a database administration operation related to the in-memory database 102, and the application module 110b may be operable to execute a security management operation related to the in-memory database.

A user interface 112 of the IDE tool 106 may display the application modules 110, in the application modules repository 108, to a user. The user may then perform a selection 114 of application modules, from the displayed application modules 110, for generating the in-memory database application 102. Since each of the application modules 110, in the application modules repository 108, corresponds to a particular in-memory database related operation, the application modules 116 may be selected depending on the operations to be included in the in-memory database application 102. In the above example, if the user wants to generate an in-memory database application 102 that includes an in-memory database administration operation and an in-memory database security management operation then the user may select the application modules 110 a and 110b, from the application modules repository 110, which are operable to execute the in-memory database management operation and the in-memory database security management operation, respectively. The selected application modules 110*a* and 110*b* may then be forwarded 118 to a build tool 120 that executes a build operation 122 on the selected application modules 110*a* and 110*b* to generate the in-memory database application 102. The generated in-memory database application 102 may be in communication with the in-memory database 104.

In one embodiment, the generated in-memory database application 102 is a "light weight" application as it includes application modules depending on the operations, which the user wants, to be included in the in-memory database application 102. In the above example, the generated in-memory database application 102 is a light weight application as it may include two application modules 110*a*-110*b* corresponding to the operations, a database management operation and a database security management operation, respectively, to be included in the in-memory database application 102. The generated "light weight" in-memory database application 102 may be provided, to an end user, as a downloadable mobile application or a cloud application hosted on a cloud.

Figure 2:
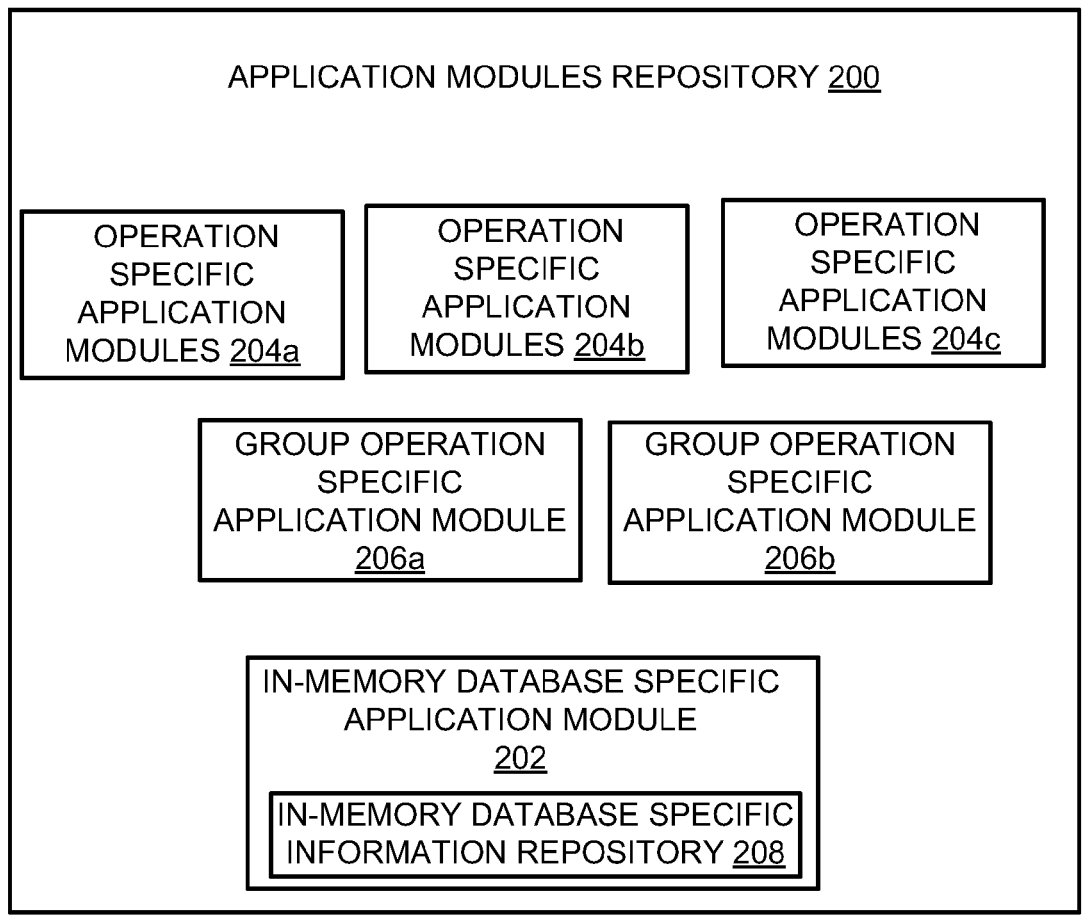
FIG. 2 is a block diagram illustrating an application modules repository installed on the IDE tool of FIG. 1, according to an embodiment.

FIG. 2 is a block diagram illustrating an application modules repository 200 installed on the IDE tool of FIG. 1, according to an embodiment. In one embodiment, the application modules repository 200 may be a software development kit (SDK) installed on the IDE tool. A SDK includes a set of software development tools that may allow a user to create a software application. The application modules repository 200 may include three different types of application modules, an in-memory database specific application module 202, operation specific application modules 204 *a-c*, and group operation specific application modules 206 *a-b*, which may allow a user to create the in-memory database application. An application module is a software component encapsulating methods for executing an operation related to the in-memory database. Each of the application modules 202, 204 *a-c*, and 206 *a-b* may be encapsulating methods for executing a different type of operation related to the in-memory database.

In one embodiment, the in-memory database specific application module 202 may be operable to communicate with the in-memory database. The in-memory database specific application module 202 may be operable to establish a communication between an in-memory database application, which includes the in-memory database specific application module 202, and the in-memory database. The in-memory database specific application module 202 may also be operable to check a user's authorization and privileges for accessing the in-memory database. In one embodiment, the in-memory database specific application module 202 may include an in-memory database specific information repository 208 that stores connection information and design time artifacts related to the in-memory database. The connection information may include the details of the connection between the in-memory database application and the in-memory database, for example, the connection information may include the details of the middleware used for connecting the in-memory database application to the in-memory database. The design time artifacts may include various in-memory database related information defined at design time. For example, consider that the in-memory database includes three different tables storing values for customer ID, customer name, and customer address, respectively. At design time, a user may define a relationship between the customer ID, customer name, and customer address attributes. In this case, a design time artifact may include the relationship between the customer ID, customer name, and customer address attributes defined at design time. This design time artifact may be used at run time to display customer ID values with respect to values of customer name attribute and the customer address attribute.

The operation specific application modules 204 *a-c* may be operable to execute operations related to the in-memory database. Although only three operation specific application modules 204 *a-c* have been shown in FIG. 2 the application modules repository 200 may include any number of operation specific application modules. In one embodiment, each of the operation specific application modules 204 *a-c* may be operable to execute a particular operation related to the in-memory database. For example, the operation specific application module 204 *a* may be operable to execute a database administration operation related to the in-memory database, the operation specific application module 204 *b* may be operable to execute a lifecycle management operation related to the in-memory database, and the operation specific application module 204 *c* may be operable to execute an information modeling operation related to the in-memory database. Since each operation specific application modules 204 *a-c* is operable to execute a particular operation related to the in-memory database, a user can select operation specific application modules, from the repository 200, depending on the operations to be included in the in-memory database application.

In one embodiment, the application modules repository 200 may also include group operation specific application modules 206 *a-b*, which may be operable to execute common operations related to a group of operation specific application modules 204 *a-c*. For example, the application modules repository 200 may include a group of data provisioning operation specific application modules for executing a data provisioning operation. Data provisioning is a process of replicating data from a source system to an in-memory database. The different data provisioning operation specific application modules, in the group, may be operable to execute different data transferring methods, such as real-time data transfer, batch data transfer, etc., for transferring data from the source system to the in-memory database. Each of the data provisioning operation specific application modules, in the group, may also require common data provisioning methods for executing the data provisioning operation. The common data provisioning methods may include, for example, a method to establish a connection between the source system and the in-memory database, a method to export data from the source system to the in-memory database, etc. A group data provisioning operation specific application module may include these common methods related to the group of data provisioning operation specific application modules.

In one embodiment, any one of the operation specific modules, from the group, and a corresponding group operation specific application module, 206 *a* or *b*, may together execute the operation related to the in-memory database. In the above example, a combination of any one of the data provisioning operation specific application module, from the group, and the group data provisioning operation specific application module may together execute the data provisioning operation. Although only two group operation specific application modules 206 *a-b* have been shown in FIG. 2 the application modules repository 200 may include any number of group operation specific application modules.

In one embodiment, the application modules 202, 204 *a-c*, and 206 *a-b* includes methods defined to execute the operation related to the in-memory database. A method is a subroutine defined to perform a particular task. For example, the methods in the in-memory database specific application module 202 may be defined to establish a communication between an in-memory database application and an in-memory database. Similarly, the operation specific application modules 204 *a-c* and the group operation specific application module 206 *a-b* may be defined to execute operations related to the in-memory database. The methods in the application modules 202, 204 *a-c*, and 206 *a-b* may include a set of create, read, update, and delete methods (CRUD methods), an activation method, and a deployment method, which are defined to execute an operation corresponding to the application module. The methods in the application modules 202, 204 *a-c*, and 206 *a-b* may also include an orchestration method that defines the process flow for executing the operation corresponding to the application modules 202, 204 *a-c*, and 206 *a-b*. The process flow may define the steps for executing the operation corresponding to the application modules 202, 204 *a-c*, and 206 *a-b*.

For example, the methods in the in-memory database specific application module 202 may include CRUD methods, activation and deployment methods, defined to establish a connection between the in-memory database application and the in-memory database, and to check user authorization and privileges for accessing the in-memory database. The create method, in the in-memory database specific application module 202, may be defined to create a connection between the in-memory database and the in-memory database application. The update method, in the in-memory database specific application module 202, may be defined to update connection details for an already created connection between the in-memory database application and the in-memory database. The read method, in the in-memory database specific application module 202, may be defined to read and retrieve data from the in-memory database. The delete method, in the in-memory database specific application module 202, may be defined to delete an existing connection between the in-memory database application and the in-memory database. The activation method, in the in-memory database specific application module 202, may be defined to activate the specified in-memory database and initiate the database services so that the in-memory database is available for connection and use by the in-memory database application. The deployment method, in the in-memory database specific application module 202, may be defined to deploy the generated in-memory database application for use. The deployment method may be also be defined for installing or uninstalling the in-memory database application from a user system.

The in-memory database specific application module 202 may also include orchestration methods defining a process flow for establishing a connection between the in-memory database application and the in-memory database and to check user authorization and privileges for accessing the in-memory database. For example, the orchestration methods may define a process flow for checking a user's authorization to access the in-memory database. Initially, a user credentials may be received from a user for accessing the in-memory database. In case the user credentials are correct then the user may be provided access to the in-memory database else a message "ACCESS DENIED" may be displayed to the user.

Similarly, the operation specific application modules 204 *a-c* may include a set of CRUD methods, activation and deployment methods, defined to execute operations related to the in-memory database. For example, consider that the operation specific application module is a database administration specific application module. In this case, the create method, in the operation specific application module, may be defined to create a monitoring equation and to set threshold values for the different database monitoring parameters. The update methods, in the operation specific application module, may be defined to update the threshold values for the different database monitoring parameters.

The orchestration methods, in the operation specific application modules 204 *a-c*, may include a process flow for executing an operation related to the in-memory database. In the above example, the orchestration method may define a process flow for executing the in-memory database management operation. The process flow may define that if the value of a database monitoring parameter is less than a pre-defined threshold value then do not send any message to the database administrator, else send a warning message "Fatal Error" to the database administrator.

The group operation specific application modules 206 *a-b* may also include CRUD methods, activation and deployment methods, defined to execute an operation related to a group of operation specific application modules. For example, consider that the group operation specific application module is a group data provisioning application module related to a group of data provisioning operation related application module. In this case, the create method, in the group operation specific application module, may be defined to create a connection between a source system and the in-memory database. An update method, in the group operation specific application module, may be defined to update connection details for an already created connection between the source system and the in-memory database. A read method, in the group operation specific application module, may be defined to read and retrieve data from the source system. A delete method, in the group operation specific application module, may be defined to delete an existing connection between the in-memory database application and the in-memory database. The orchestration method, in the group operation specific application module, may define a process flow for executing the operation related to the group of operation specific application module. In the above example, the orchestration method may define the process flow for executing the group data provisioning operation.

In one embodiment, each of the application modules 202, 204 *a-c*, and 206 *a-b* may store a source code that includes the different methods corresponding to the application modules 202, 204 *a-c*, and 206 *a-b*. The source code may be compressed and stored as a JAR (Java™ Archive) file in the application modules 202, 204 *a-c*, and 206 *a-b*. A source code is a collection of computer instructions written using some human-readable computer language. The source code is automatically translated to machine code that the computer can directly read and execute. In one embodiment, a user can view source code, stored in the application modules 202, 204 *a-c*, and 206 *a-b*, on the user interface of the IDE tool. The user may then modify the displayed source code by performing a code refactoring operation on the source code. Code refactoring is a technique for restructuring an existing body of code, altering its internal structure undertaken in order to improve some of the nonfunctional attributes of the software. Code refactoring may be done by applying a series of "refactoring", each of which is a change in a computer program's source code that does not modify its conformance to functional requirements. The source code refactoring may be performed based on the instructions received from a user on the IDE tool. In one embodiment, the source code refactoring may be used for modifying the application modules, such that the modified application modules are operable to perform a different operation related to the in-memory database.

In one embodiment, the application modules 202, 204 *a-c*, and 206 *a-b* are downloaded to the IDE tool as application plugins. A plugin is a set of software components that adds specific abilities to a larger software application. Plug-ins may enable customizing the functionality of an application. For example, the application modules repository 200 may include an in-memory database specific plugin, a database administration (operation) specific plugin, a database security (operation) specific plugin, a database provisioning (group operation) specific plugin, etc.

Figure 3:
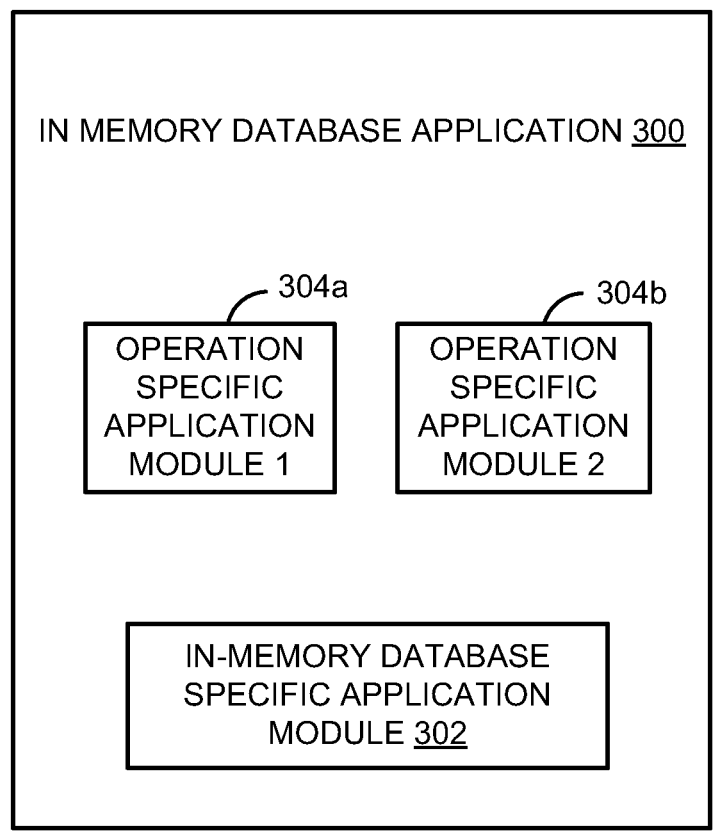
FIG. 3 is a block diagram illustrating an in-memory database application, according to an embodiment.

FIG. 3 is a block diagram 300 illustrating an in-memory database application, according to an embodiment. The in-memory database application 300 may be generated by selecting application modules from the application modules repository 200 of FIG. 2 and then executing a build process on the selected application modules. During the build process, the build tool of the IDE tool compiles and links the selected application modules in the correct order to generate the in-memory database application. In one embodiment, the in-memory database application 300 may include at least one operation specific application module and an in-memory database specific application module 302, selected from the application modules repository of FIG. 2. The operation specific application module may define the operation to be included in the in-memory database application 300. As discussed above, each of the operation specific application modules corresponds to a particular operation related to the in-memory database; therefore, the user may select the operation specific application modules depending on the operations to be included in the in-memory database application 300. The in-memory database application 300 includes two operation specific application modules 304*a* and 304*b* and may therefore execute two operations related to the in-memory database. For example, if the operation specific application modules 304*a* and 304*b*, included in the in-memory database application 300, correspond to database administration operation and security management operation then the in-memory database application 300 may execute the in-memory database administration operation and the in-memory database security management operation. The generated in-memory database application 300 is a light weight application as it only includes the selected operation specific application 304*a* and 304*b* corresponding to the operations, which the user wants, to be included in the in-memory database application 300.

The in-memory database specific application module 302, included in the in-memory database application 300, may establish a communication between the in-memory database application 300 and the in-memory database. Based on the established connection, the in-memory database application 300 may access the in-memory database to execute the in-memory database related operations. The generated in-memory database application 300 may be stored in a mobile application store or hosted in a cloud. An end user can use the generated in-memory database application 300 by downloading the in-memory database application 300 from a mobile application store or by accessing the in-memory database application 300 hosted in the cloud by using a web browser.

In one embodiment, a role may be assigned to a user, of the in-memory database application 300, based on the operation specific application modules 304 *a-b* included in the in-memory database application 300. For example, a user of an in-memory database application, including an in-memory database administration (operation) specific application module, may be assigned a data administrator role. Similarly, a user of an in-memory database application, including information modeling (operation) specific application module, may be assigned an application developer role. A role based access control may then be provided, for the in-memory database, based on the assigned roles. Providing role based access to the in-memory database may address any in-memory database access related security concerns when creating the in-memory database application 300. For example, the user, of an in-memory database administration application assigned a database administrator role may be provided a read-write-modify access rights with respect to the in-memory database, whereas a user, of an information modeling application, assigned an application developer role may only be provided a read access right with respect to the in-memory database.

Figure 4:
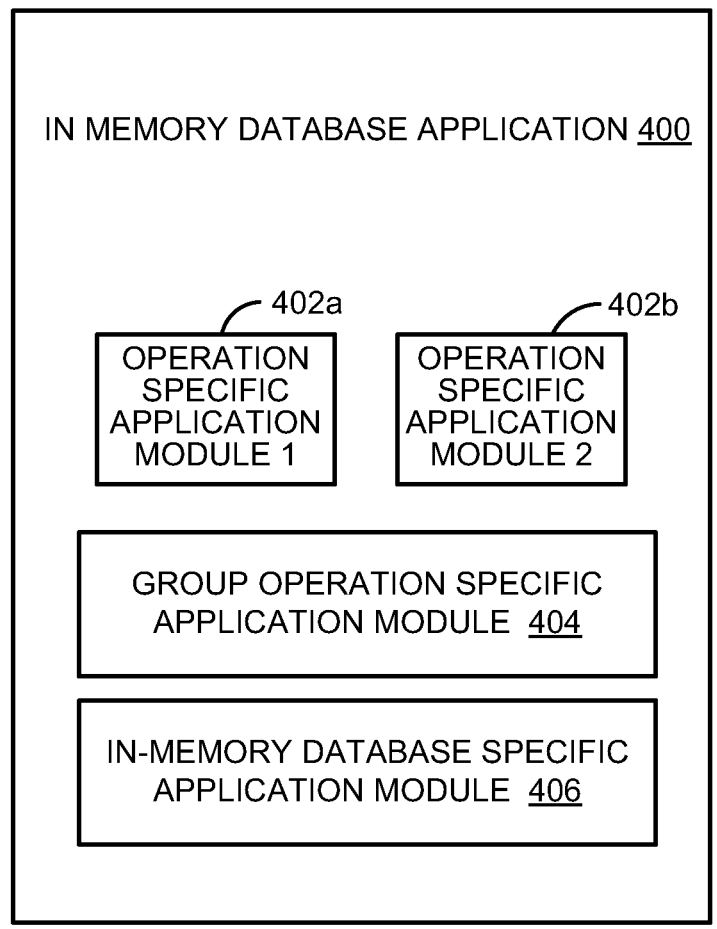
FIG. 4 is a block diagram illustrating an in-memory database application, according to another embodiment.

FIG. 4 is a block diagram illustrating an in-memory database application 400, according to another embodiment. The in-memory database application 400 may be generated for executing an operation, corresponding to a group of operation specific application modules, related to the in-memory database. In one embodiment, the in-memory database application 400 may include operation specific application modules 402 *a-b* from a group of operation specific application modules. The in-memory database application 400 may also include a group operation specific application module 404 that includes common methods related to the group of operation specific application modules 402 *a-b*. Further, the in-memory database application 400 may also include an in-memory database specific application module 406 for establishing a connection between the in-memory database application 400 and the in-memory database. As discussed above, the application modules repository may include a group of data provisioning operation specific application modules. In this case, a data provisioning in-memory database application, for executing a data provisioning operation, may include different operation specific application modules corresponding to the different data transferring methods from the source system to the in-memory database, a data provisioning group operation specific application module including common data provisioning methods that in combination with the data transferring methods may execute the data provisioning operation, and an in-memory database specific application module for establishing a connection between the in-memory database application and the in-memory database.

Figure 5:
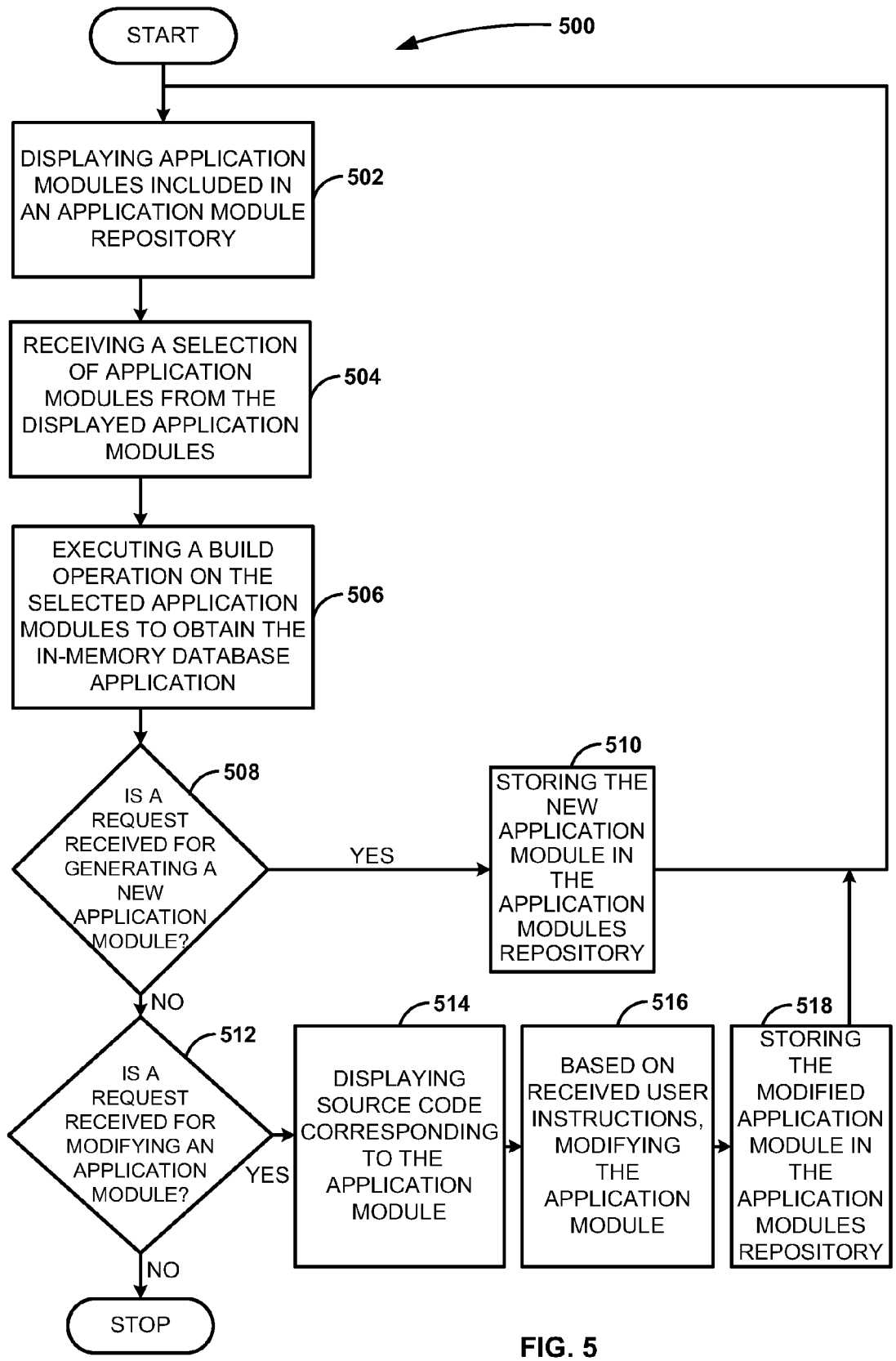
FIG. 5 is a detailed flow diagram illustrating a method for generating an in-memory database specific application, according to an embodiment.

FIG. 5 is a detailed flow diagram 500 illustrating a method for generating an in-memory database specific application, according to an embodiment. Initially at block 502 the application modules, included in the application modules repository of the IDE tool, may be displayed on a user interface of the IDE tool. In one embodiment, the name of the application modules, in the application modules repository, may be displayed on the user interface of the IDE tool. Next at block 504 the IDE tool may receive a selection of application modules from the application modules displayed at block 502. The user may select application modules depending on the operations the user wants to be included in the in-memory database application. In one embodiment, the selected application modules may include a combination of in-memory database specific application module and operation specific application modules. In another embodiment, the selected modules may include a combination of operation specific application modules selected from a group of operation specific application modules, a group operation specific application module related to the group of operation specific application modules, and in-memory database specific application modules.

Next at block 506, a build operation may be executed on the application modules selected at block 504 to generate the in-memory database application. The build operation may include compiling and linking the selected application modules to generate the in-memory database application. During the compilation process the source code in the JAR files of the selected application modules may be converted to an executable code. During the compilation operation the selected application modules may be linked in the correct order to generate the in-memory database application.

In one embodiment, a check may be made to determine whether a request is received from a user to generate a new application module (block 508). The received request, may be, to generate a new operation specific application module. In one embodiment, the request received from the user may be a source code including CRUD methods, activation, deployment methods, defined to execute the new operation related to the in-memory database, and orchestration methods defining the process flow for executing the new operation. The received source code may be compressed and stored in a JAR file to obtain the new application module. The generated new application module may be stored in the application modules repository (block 510). In one embodiment, the new application module may be displayed along with other application modules, in the application modules repository, the next time a user accesses the IDE tool.

In one embodiment, a check may be made to determine whether a request is received from a user, at the IDE tool, for modifying an application module stored in the application modules repository (block 512). Based on the user selection, the IDE tool may display the source code corresponding to the selected application module on the user interface of the IDE tool (block 514). The source code may include the methods for executing an in-memory database specific operation corresponding to the application module. A user instruction may then be received for modifying the application module. In one embodiment, the user instructions may include instructions for modifying the source code of the application module displayed on the user interface. For example, assume that the application module to be modified is a database management operation related application module. The source code corresponding to the database management operation specific application module may be displayed to a user. The user may then modify a portion of the source code that corresponds, for example, to the orchestration methods of the database management operation. For example, the user may modify the orchestration methods of the source code to define that a system shutdown is performed when the value of the monitoring parameter is greater than the threshold value instead of sending a warning message to the user.

Next, based on the received instructions from the user the application module may be modified (block 516). In one embodiment, the modified source code is compressed and stored in a JAR file to obtain the modified application module. Finally, the modified application module may be stored in the application modules repository (block 518). In one embodiment, the modified application module may be displayed along with other application modules, in the application modules repository, the next time user accesses the IDE tool.

Figure 6:
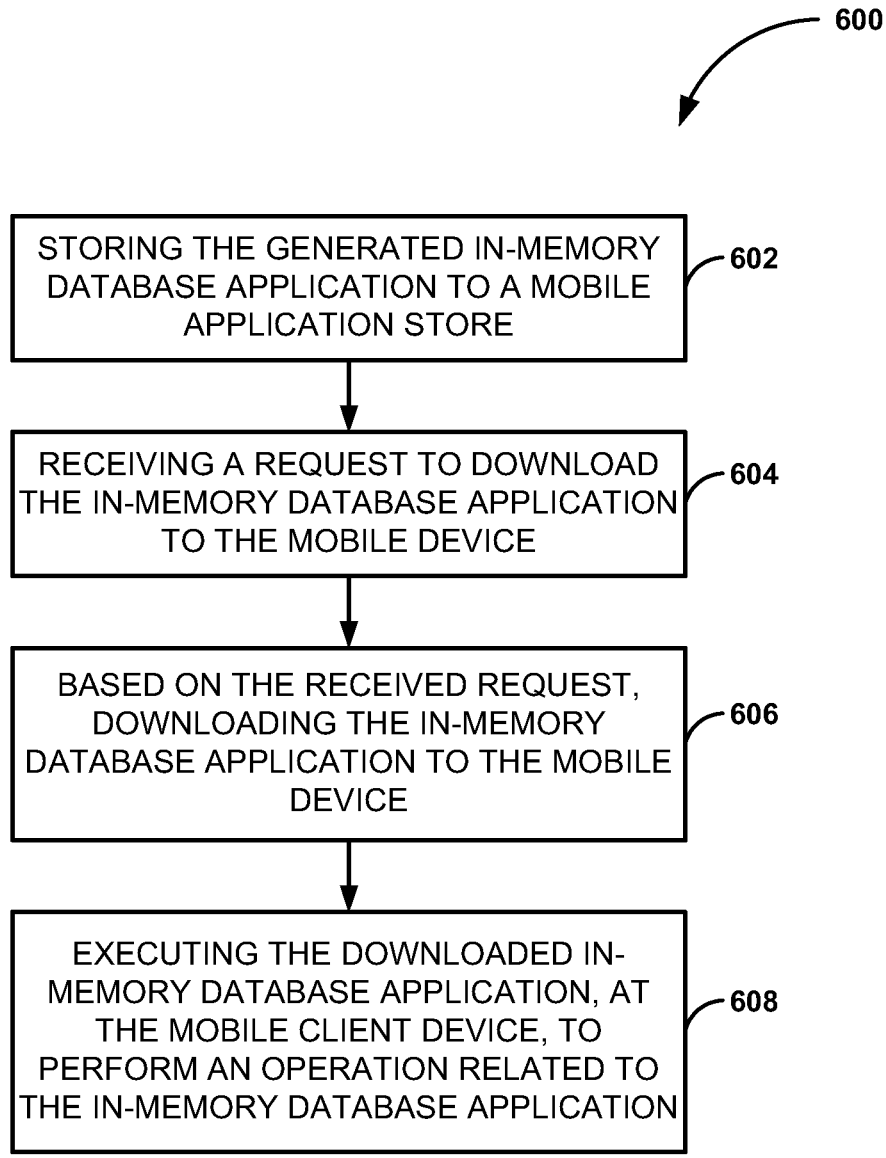
FIG. 6 is a flow diagram illustrating a method for executing an in-memory database application at a mobile client device, according to an embodiment.

FIG. 6 is a flow diagram 600 illustrating a method for executing the in-memory database application at a mobile client device, according to an embodiment. Initially at block 602 the generated in-memory database application may be stored in a mobile application store. The mobile application store may be an application or a website, for example, an on-device application, an on-device wireless application protocol (WAP) website, an internet website, a personal computer application, etc., or a physical location such as a retail kiosk that sells mobile applications. The mobile application store may receive a request, from a mobile device, for downloading the in-memory database application to the mobile client device (block 604). Based on the received request, the in-memory database application may be downloaded to the mobile client device (block 606). Finally, the downloaded in-memory database application may be executed on the mobile client device (block 608). Executing the in-memory database application may allow a mobile client device user to perform the in-memory database related operation supported by the in-memory database application.

Figure 7:
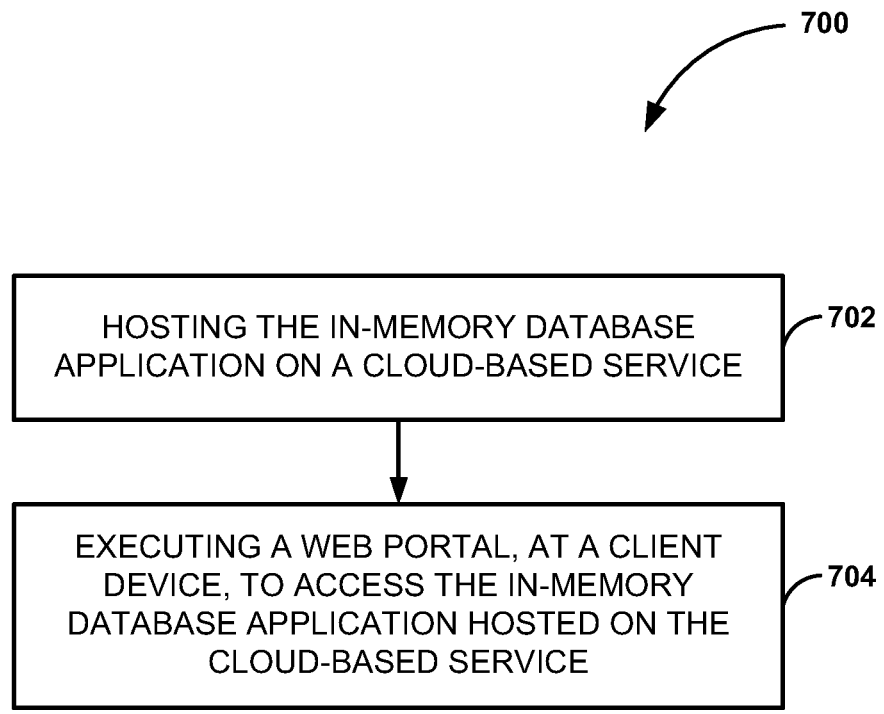
FIG. 7 is a flow diagram illustrating a method for accessing the in-memory database application hosted in a cloud based service, according to an embodiment.

FIG. 7 is a flow diagram 700 illustrating a method for accessing the in-memory database application hosted in a cloud based service, according to an embodiment. Initially at block 702, the generated in-memory database application may be hosted in the cloud based service. Cloud computing is the use of computing resources (hardware and software) that are delivered as a service over a network. In one embodiment, the cloud based service is a Platform as a Service (PAAS). PAAS is a category of cloud computing service that provides a computing platform and a solution stack as a service. In one embodiment, a PaaS vendor may offer application hosting and deployment environment, along with various integrated services. Services offer varying levels of scalability and maintenance. In one embodiment, the cloud based service may also include the in-memory database along with the in-memory database application.

Next at block 704 a web portal at a client device may be executed to access the in-memory database hosted on the cloud based service. A web portal is a web site that brings information from diverse sources in a unified way. A user accessing the web portal may then perform any of the in-memory database related operation supported by the in-memory database application.

Figure 8:
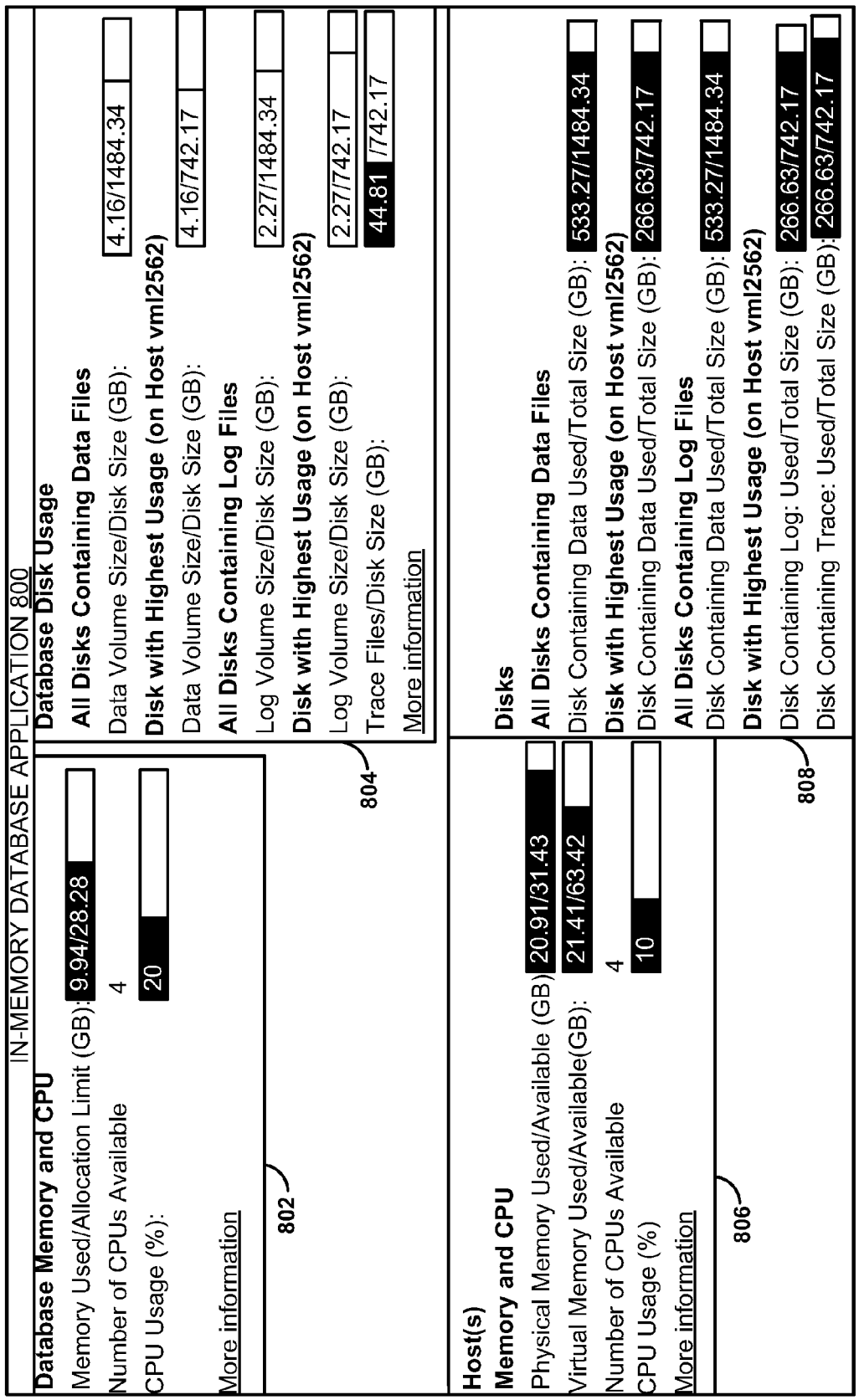
FIG. 8 is a block diagram illustrating an exemplary in-memory database application, according to an embodiment

FIG. 8 is a block diagram illustrating an exemplary in-memory database application 800, according to an embodiment. The in-memory database application 800 is an in-memory database management application for managing the in-memory database. The in-memory database management application 800 may monitor and display values for different parameters related to the in-memory database. For example, the in-memory database management application 800 may monitor and display values for the in-memory database memory and CPU usage 802, the in-memory database disk usage 804, a host system's memory usage and availability information 806, and a disk storage usage information 808. The in-memory database management application 800 may include an in-memory database management operation specific application module that may include several methods including a create method for setting the threshold value for each of the monitoring parameters, and an update method for updating the threshold values of the monitoring parameters. The in-memory database management application 800 may also include an in-memory database related application module for connecting the in-memory database application to the in-memory database. Based on the established connection, the in-memory database management application 800 may monitor the values for each of the monitoring parameters. The in-memory database management application 800 may also include an orchestration method that may define a process for executing the database management operation. The orchestration method may define that if the value of any of the monitoring parameter is above a threshold value then a warning message has to be sent to a database administrator.

Some embodiments may include the above-described methods being written as one or more software components. These components, and the functionality associated with each, may be used by a client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
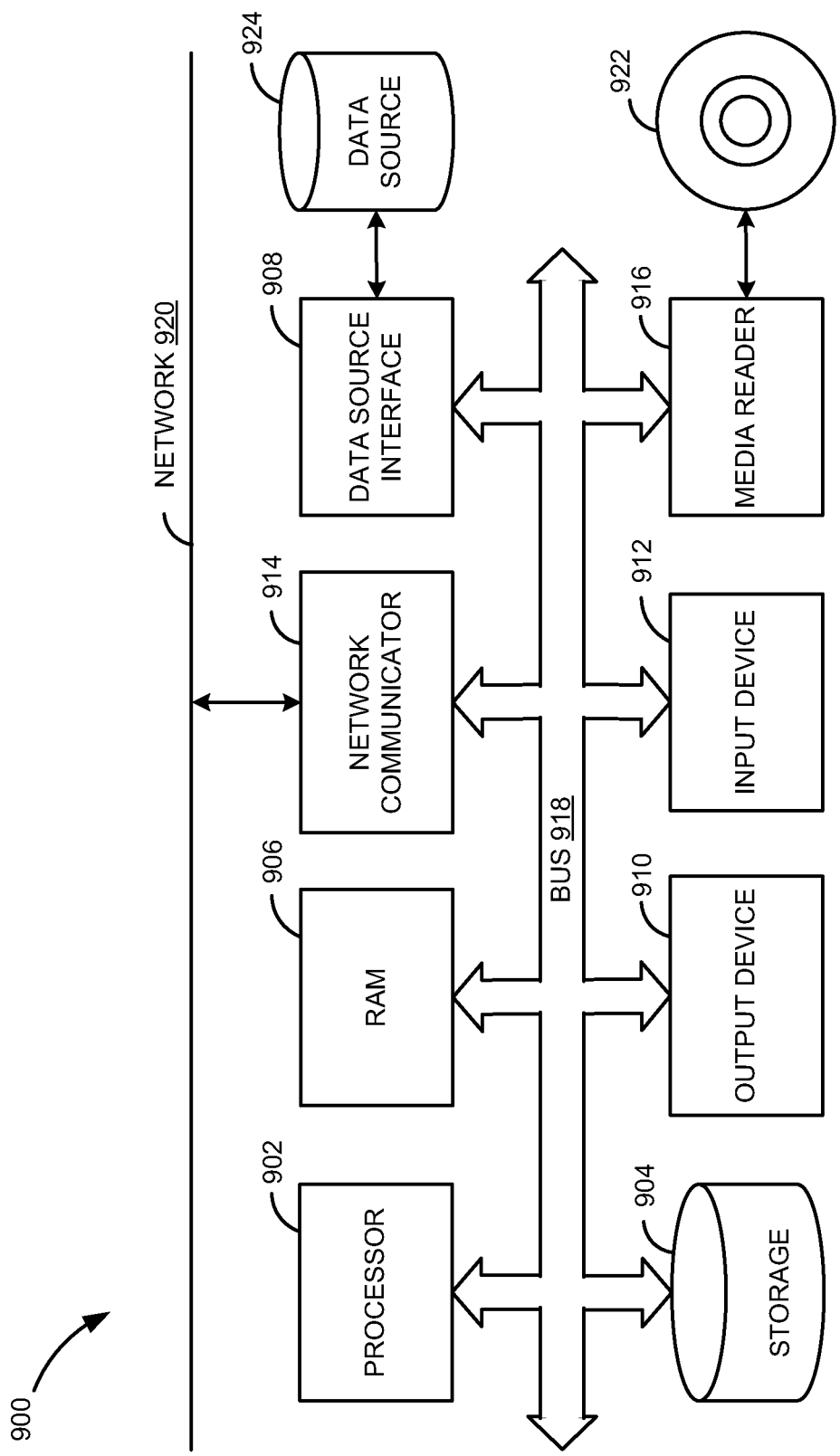
FIG. 9 is a block diagram illustrating a computing environment in which the techniques described for generating an in-memory database application can be implemented, according to an embodiment.

FIG. 9 is a block diagram of an exemplary computer system 900. The computer system 900 includes a processor 902 that executes software instructions or code stored on a computer readable storage medium 922 to perform the above-illustrated methods. The processor 902 can include a plurality of cores. The computer system 900 includes a media reader 916 to read the instructions from the computer readable storage medium 922 and store the instructions in storage 910 or in random access memory (RAM) 915. The storage 904 provides a large space for keeping static data where at least some instructions could be stored for later execution. According to some embodiments, such as some in-memory computing system embodiments, the RAM 906 can have sufficient storage capacity to store much of the data required for processing in the RAM 906 instead of in the storage 910. In some embodiments, all of the data required for processing may be stored in the RAM 906. The stored instructions may be further compiled to generate other representations of the instructions and dynamically stored in the RAM 906. The processor 902 reads instructions from the RAM 906 and performs actions as instructed. According to one embodiment, the computer system 900 further includes an output device 910 (e.g., a display) to provide at least some of the results of the execution as output including, but not limited to, visual information to users and an input device 912 to provide a user or another device with means for entering data and/or otherwise interact with the computer system 900. Each of these output devices 910 and input devices 912 could be joined by one or more additional peripherals to further expand the capabilities of the computer system 900. A network communicator 914 may be provided to connect the computer system 900 to a network 920 and in turn to other devices connected to the network 920 including other clients, servers, data stores, and interfaces, for instance. The modules of the computer system 900 are interconnected via a bus 918. Computer system 900 includes a data source interface 908 to access data source 924. The data source 924 can be accessed via one or more abstraction layers implemented in hardware or software. For example, the data source 924 may be accessed by network 920. In some embodiments the data source 924 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. An application modules repository installed on an integrated development environment (IDE) tool, the application modules repository stored in a memory of a computer comprising:
   a plurality of application modules stored in the memory including:
   an in-memory database specific application module operable to communicate with an in-memory database, wherein the in-memory database specific application module includes:
      one or more orchestration methods defining a process flow for establishing a communication between an in-memory database application and the in-memory database;
   a plurality of operation specific application modules operable to execute a plurality of operations related to the in-memory database; and
   a group operation specific application module operable to execute an operation related to a group of operation specific application modules from the plurality of operation specific application modules, wherein the IDE tool is configured to receive a selection of one or more application modules from the plurality of application modules, and generate the in-memory database application by executing a build process on the selected one or more application modules, and wherein when the selected one or more application modules exclude the group operation specific application module, the generated in-memory database application includes only the in-memory database specific application module and at least one of the plurality of operation specific application modules.

2. The application modules repository of claim 1, wherein the in-memory database specific application module includes:
   a set of create, read, update, and delete (CRUD) methods defined to establish the communication between the generated in-memory database application and the in-memory database.

3. The application modules repository of claim 1, wherein the plurality of operation specific application modules include:
   a set of CRUD methods defined to execute the plurality of operations; and
   one or more second orchestration methods defining a process flow for executing plurality of operations.

4. A computer implemented method for generating an in-memory database application in communication with an in-memory database, the method comprising:
   displaying, on a user interface of an integrated development (IDE) tool, a plurality of application modules included in an application modules repository, the plurality of application modules including an in-memory database specific application module operable to communicate with the in-memory database and a plurality of operation specific application modules operable to execute a plurality of operations related to the in-memory database, wherein the in-memory database specific application module includes:
      one or more orchestration methods defining a process flow for establishing a communication between an in-memory database application and the in-memory database;
   receiving a selection of one or more application modules from the plurality of displayed application modules; and
   executing, by a processor of the computer, a build process on the selected one or more application modules to generate the in-memory database application, wherein when the selected one or more application modules exclude a group operation specific application module, the in-memory database application including only the in-memory database specific application module and at least one of the operation specific application modules.

5. The computer implemented method according to claim 4, further comprising modifying an application module from the plurality of application modules, wherein modifying the application module includes:
   displaying, on the user interface of the IDE tool, source code associated with an application module from the plurality of application modules;
   based on received instructions for code refactoring of the displayed source code, generating a modified application module operable to execute a modified operation related to the in-memory database; and
   storing the modified application module in the application modules repository.

6. The computer implemented method of claim 4, further comprising:
   storing the generated in-memory database application in a mobile application store;
   receiving a request to download the stored in-memory database application to a mobile client device;
   based on the received request, downloading the generated in-memory database application to the mobile client device; and
   executing, at the mobile client device, the downloaded in-memory database application to perform one or more of the plurality of operations related to the in-memory database.

7. The computer implemented method of claim 4, further comprising:
   based on instructions received at the IDE tool, generating, by the processor of the computer, a new operation specific application module operable to execute an operation related to the in-memory database; and
   storing the generated new operation specific application module in the application modules repository.

8. The computer implemented method of claim 4, further comprising:
   executing, at a client device, a web portal to access the generated in-memory database application hosted on a cloud-as a service.

9. The computer implemented method of claim 4, wherein displaying the plurality of application modules includes:
   displaying, on the user interface of the IDE tool, the group operation specific application module operable to execute the operation related to a group of operation specific application modules from the plurality of operation specific application modules, wherein the generated in-memory database application includes the in-memory database specific application module, the group operation specific application module, and at least one of the operation specific application modules.

10. A computer system for generating an in-memory database application in communication with an in-memory database, the computer system comprising:
 a memory to store a program code; and
 a processor communicatively coupled to the memory, the processor configured to execute the program code to:
  display, on a user interface of an integrated development environment (IDE) tool, a plurality of application modules included in an application modules repository, the plurality of application modules including an in-memory database specific application module operable to communicate with the in-memory database, a plurality of operation specific application modules operable to execute a plurality of operations related to the in-memory database, and a group operation specific application module operable to execute an operation related to a group of operation specific application modules from the plurality of operation specific application modules, wherein the in-memory database specific application module includes:
   one or more orchestration methods defining a process flow for establishing a communication between an in-memory database application and the in-memory database;
  receive a selection of one or more application modules from the plurality of displayed application modules; and
  execute a build process on the selected one or more application modules to generate the in-memory database application, wherein when the selected one or more application modules exclude the group operation specific module, the generated in-memory database application includes only the in-memory database specific application module and at least one of the operation specific application modules.

11. The system of claim 10, wherein the processor further executes the program code to:
 display, on the user interface of the IDE tool, source code associated with an application module from the plurality of application modules;
 based on received instructions for code refactoring of the source code, generate a modified application module operable to execute a modified operation related to the in-memory database; and
 store the modified application module in the application modules repository.

12. The system of claim 10, wherein the processor further executes the program code to:
 store the generated in-memory database application in a mobile application store;
 receive a request to download the stored in-memory database application to a mobile client device;
 based on the received request, download the generated in-memory database application to a mobile client device; and
 execute, at the mobile client device, the downloaded in-memory database application to perform one or more of the plurality of operations related to the in-memory database.

13. The system of claim 10, wherein the processor further executes the program code to:
 based on instructions received at the IDE tool, generate a new operation specific application module operable to execute an operation related to the in-memory database; and
 store the generated new operation specific application module in the application modules repository.

14. The system of claim 10, wherein the processor further executes the program code to:
 execute, at a client device, a web portal to access the generated in-memory database application hosted on a cloud-as a service.

15. An article of manufacture including a non-transitory computer readable storage medium to tangibly store instructions, which when executed by a computer, cause the computer to:
 display, on a user interface of an integrated development environment (IDE) tool, a plurality of application modules included in an application modules repository, the plurality of application modules including an in-memory database specific application module operable to communicate with an in-memory database, a plurality of operation specific application modules operable to execute a plurality of operations related to the in-memory database, and a group operation specific application module operable to execute an operation related to a group of operation specific application modules from the plurality of operation specific application modules, wherein the in-memory database specific application module includes:
  a set of create, read, update, and delete (CRUD) methods defined to establish a communication between the in-memory database application and the in-memory database; and
  one or more orchestration methods defining a process flow for establishing the communication between the in-memory database application and the in-memory database;
 receive a selection of one or more application modules from the plurality of displayed application modules; and
 execute a build process on the selected one or more application modules to generate the in-memory database application, wherein when the selected one or more application modules exclude the group operation specific module, the generated in-memory database application includes only the in-memory database specific application module and at least one of the operation specific application modules.

16. The article of manufacture of claim 15, further comprising instructions which when executed by the computer further causes the computer to:
 display, on the user interface of the IDE tool, source code associated with an application module from the plurality of application modules;
 based on received instructions for code refactoring of the displayed source code, generate a modified application module operable to execute a modified operation related to the in-memory database; and
 store the modified application module in the application modules repository.

17. The article of manufacture of claim 15, further comprising instructions which when executed by the computer further causes the computer to:
 store the generated in-memory database application in a mobile application store;
 receive a request to download the stored in-memory database application to a mobile client device;

based on the received request, download the generated in-memory database application to a mobile client device; and execute, at the mobile client device, the downloaded in-memory database application to perform one or more of the plurality of operations related to the in-memory database.

18. The article of manufacture of claim 15, further comprising instructions which when executed by the computer further causes the computer to:

based on instructions received at the IDE tool, generate a new operation specific application module operable to execute an operation related to the in-memory database; and store the generated new operation specific application module in the application modules repository.

19. The article of manufacture of claim 15, further comprising instructions which when executed by the computer further causes the computer to:

execute, at a client device, a web portal to access the generated in-memory database application hosted on a cloud-as a service.

* * * * *